(12) United States Patent
Nguyen et al.

(10) Patent No.: US 8,452,936 B2
(45) Date of Patent: *May 28, 2013

(54) SYSTEM AND METHOD FOR MANAGING RESETS IN A SYSTEM USING SHARED STORAGE

(75) Inventors: Nam V. Nguyen, Round Rock, TX (US); Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,770

(22) Filed: Mar. 6, 2012

(65) Prior Publication Data

US 2012/0166750 A1   Jun. 28, 2012

Related U.S. Application Data

(63) Continuation of application No. 11/460,889, filed on Jul. 28, 2006, now Pat. No. 8,156,296.

(51) Int. Cl.
*G06F 12/00* (2006.01)

(52) U.S. Cl.
USPC ............ 711/163; 711/166; 709/208; 709/225

(58) Field of Classification Search
USPC ............ 711/163, 166; 709/208, 225; 710/240
See application file for complete search history.

(56) References Cited

U.S. PATENT DOCUMENTS

| | | | |
|---|---|---|---|
| 5,757,642 A | 5/1998 | Jones | 364/134 |
| 5,933,824 A | 8/1999 | DeKoning et al. | 707/8 |
| 6,185,601 B1 | 2/2001 | Wolff | 709/203 |
| 6,209,023 B1 | 3/2001 | Dimitroff et al. | 709/211 |
| 6,247,099 B1 | 6/2001 | Skazinski et al. | 711/141 |
| 6,338,110 B1 | 1/2002 | van Cruyningen | 710/131 |
| 6,430,645 B1 | 8/2002 | Basham | 710/305 |
| 6,449,730 B2 | 9/2002 | Mann et al. | 714/6 |
| 6,460,113 B1 | 10/2002 | Schubert et al. | 711/111 |
| 6,484,245 B1 | 11/2002 | Sanada et al. | 711/164 |
| 6,493,804 B1 | 12/2002 | Soltis et al. | 711/152 |
| 6,532,538 B1 | 3/2003 | Cronk et al. | 713/2 |
| 6,742,034 B1 | 5/2004 | Schubert et al. | 709/226 |
| 7,120,837 B1 | 10/2006 | Ferris | 714/56 |
| 7,254,736 B2 | 8/2007 | Karr et al. | 713/500 |
| 2006/0106997 A1 | 5/2006 | Elliott | 711/150 |

FOREIGN PATENT DOCUMENTS

| | | |
|---|---|---|
| EP | 0 033 915 A1 | 8/1981 |
| WO | 98/28684 A1 | 7/1998 |

OTHER PUBLICATIONS

"Oracle 9i Administrator's Reference: Oracle Cluster Management Software for Linux," at http://download.oracle.com/docs/html/A97297_01/appf_ocm.htm, Retrieved Oct. 12, 2009.
Singapore Search Report for Singapore Patent Application No. 200100776-4 (7 pages), Oct. 18, 2002.
White Paper "Microsoft Windows NT Clusters" Microsoft Exchange 5.5, Microsoft Corp. (17 pages), 1997.
Massiglia "Fibre Channel, Storage Area Network, and Disk Array Systems" Adaptec Inc. (22 pages), Apr. 13, 1998.

*Primary Examiner* — Matthew Bradley
(74) *Attorney, Agent, or Firm* — Baker Botts L.L.P.

(57) ABSTRACT

A method of managing storage device resets in a system using shared storage is provided. A reset instruction is received at a shared storage device from a first node. In response, the storage device is at least partially reset, including aborting one or more queued I/O commands including a first I/O command received from a second node. A reset notification timer is started. If an I/O command is received from the second node during the reset notification timer, in response to receiving the I/O command the second node is notified of the storage device reset such that the second node can determine that the first I/O command was aborted. If no I/O command is received from the second node during the reset notification timer, at the expiration of the timer, the second node is notified of the storage device reset such that the second node can determine that the first I/O command was aborted.

20 Claims, 2 Drawing Sheets

SYSTEM AND METHOD FOR MANAGING RESETS IN A SYSTEM USING SHARED STORAGE

RELATED APPLICATIONS

This application is a continuation of pending U.S. patent application Ser. No. 11/460,889 filed Jul. 28, 2006, now U.S. Pat. No. 8,156,296 issued Apr. 10, 2012, the contents of which is incorporated herein in its entirety by this reference.

TECHNICAL FIELD

The present disclosure relates generally to information handling systems and, more particularly, to a system and method for managing resets in a system using shared storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Groups of information handling systems are often arranged in cluster configurations. In some clusters (e.g., an ORACLE cluster), a group of nodes may be connected to a shared storage system such that the nodes may store data in, and retrieve data from, the storage system using I/O (input/output) commands. Such configuration may be referred to as a shared storage configuration. There are two basic types of I/O commands that a node can send to the storage system: (1) read commands to retrieve data from the storage system and (2) write commands to write data to the storage system.

In some configurations, if a node sends one or more I/O commands to the storage system and does not receive a notification of completion within some specified time, the associated operating system (OS) will send a reset instruction (e.g., a bus reset, a target reset, or a LUN reset) to the storage system to reset the storage system (or at least a portion of the storage system) and/or to retrieve the timed-out I/O command(s) from the storage system.

However, in a shared storage configuration (e.g., a shared storage cluster or a storage consolidation solution), the reset initiated by one node may cause I/O commands sent by other nodes and queued in the storage system to be aborted or erased from their respective queues. In some environments (e.g., in a Fibre Channel or Serial Attached SCSI (SAS) environment) and in some situations (e.g., during heavy loading situations where nodes have many outstanding I/O commands), the other nodes may not be aware that the storage system has been reset and their I/O commands have been aborted. As a result, the nodes may time out those aborted I/O commands and may send their own reset instructions to the storage system, which may negatively affect the cluster or configuration.

For example, if node A initiates a first reset at the storage system, the storage system may abort all queued I/O commands, including one or more I/O commands sent from node B. Node B may be unaware of the storage system, and may continue waiting for a response to a particular I/O command that was queued in the storage system and aborted during the reset. After a timer expires and no response has been received at node B from the storage system, node B may send its own reset to the storage system. In this manner, a series of resets may be triggered, which may bring down or make unstable the entire cluster or configuration (or a portion thereof), which may be inefficient, expensive, and/or may lead to other system problems.

SUMMARY

Therefore, a need has arisen for systems and methods for reducing the occurrence of undesirable multiple resets in a shared storage cluster.

According to one embodiment of the present disclosure, a method of managing storage device resets in a system using shared storage is provided. A reset instruction is received at a shared storage device from a first node. At least a portion of the storage device is reset in response to the reset instruction, including aborting one or more queued I/O commands including a first queued I/O command received from a second node. A reset notification timer is started. If an I/O command is received from the second node during the duration of the reset notification timer, in response to receiving the I/O command the second node is notified of the storage device reset such that the second node can determine that the first I/O command was aborted. If no I/O command is received from the second node during the duration of the reset notification timer, in response to the expiration of the timer, the second node is notified of the storage device reset such that the second node can determine that the first I/O command was aborted.

According to another embodiment of the present disclosure, an information handling system is provided. The information handling system may include a reset management system. The reset management system may be operable to receive a reset instruction from a first node that shares a storage device, and in response to receiving the reset instruction, reset at least a portion of the storage device. Resetting at least a portion of the storage device may include aborting one or more queued I/O commands, including a first queued I/O command received from a second node that shares the storage device. The reset management system may be further operable to start a reset notification timer having a defined duration. If an I/O command is received from the second node during the duration of the reset notification timer, the reset management system may, in response to receiving the I/O command, notify the second node of the storage device reset such that the second node can determine that the first I/O command was aborted. Alternatively, if no I/O command is received from the second node during the duration of the reset notification timer, the reset management system may, in response to the expiration of the timer, notify the second node of the storage device reset such that the second node can determine that the first I/O command was aborted.

According to another embodiment of the present disclosure, a system includes a plurality of nodes coupled to and configured to share a storage device. The plurality of nodes may include at least a first node and a second node. The first node may be configured to send a reset instruction to the storage device. The storage device may be configured to reset at least a portion of the storage device in response to receiving the reset instruction from the first node. Resetting at least a portion of the storage device may include aborting one or more queued I/O commands, including a first queued I/O command received from the second node. The storage device may be further configured to start a reset notification timer having a defined duration. If an I/O command is received from the second node during the duration of the reset notification timer, the storage device may, in response to receiving the I/O command, notify the second node of the storage device reset such that the second node can determine that the first I/O command was aborted. Alternatively, if no I/O command is received from the second node during the duration of the reset notification timer, the storage device may, in response to the expiration of the timer, notify the second node of the storage device reset such that the second node can determine that the first I/O command was aborted.

One technical advantage of the present disclosure is that the occurrence of undesirable multiple resets in a shared storage cluster may be reduced, which may increase the stability of the cluster, increase system efficiency, reduce expenses, and/or prevent or reduce other system problems.

Other technical advantages may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
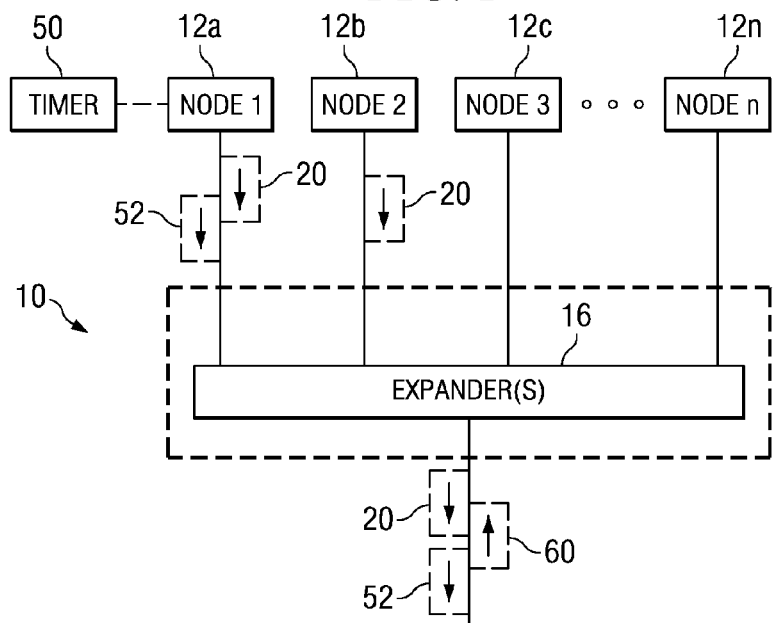
FIG. 1 illustrates an example configuration of a shared storage cluster according to one embodiment of the present disclosure.
Figure 2:
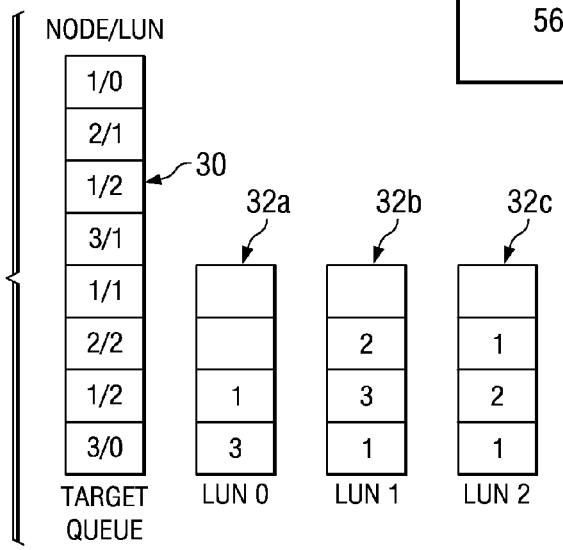
FIG. 2 illustrates an example target I/O queue and example LUN I/O queues for organizing or ordering I/O commands received from various nodes, according to one embodiment of the present disclosure.
Figure 3:
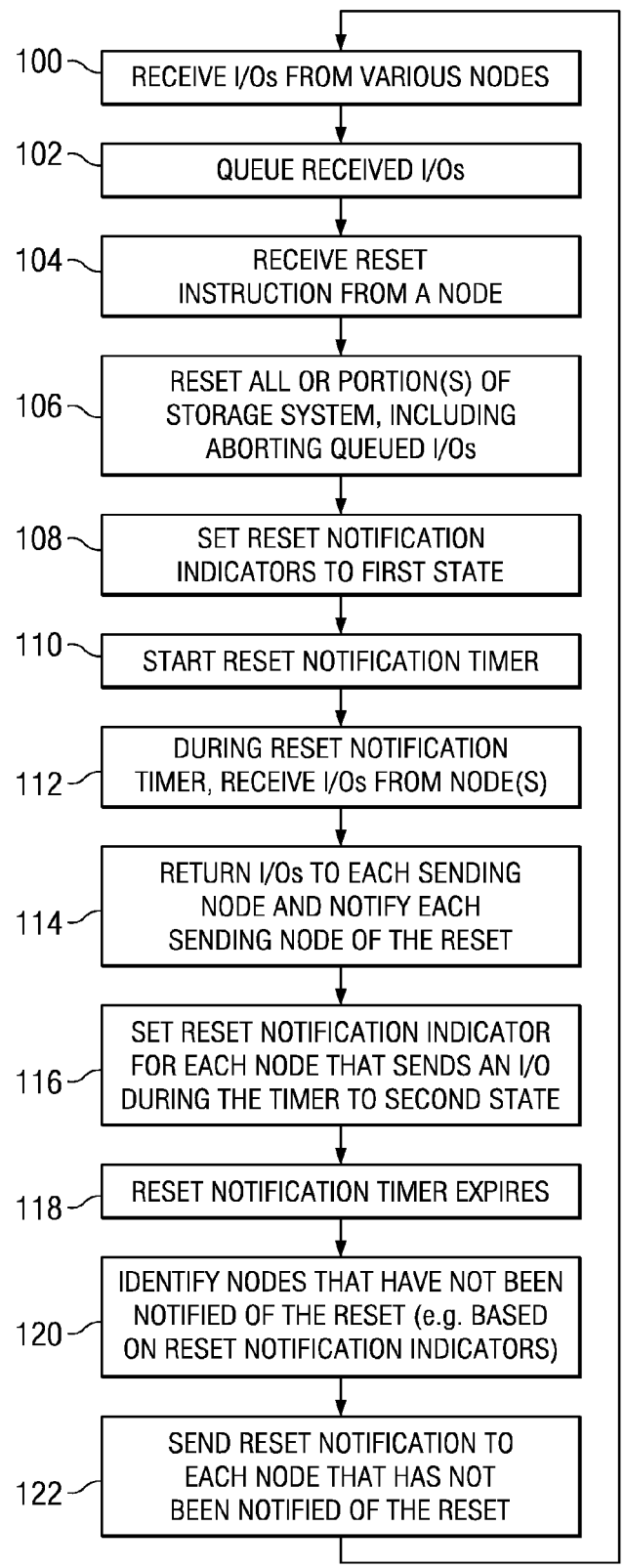
FIG. 3 illustrates a method of managing storage system resets and reset notifications, according to certain embodiments of the disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates an example configuration of a shared storage cluster 10 according to one embodiment of the present disclosure. Cluster 10 may include a plurality of nodes 12 (nodes 1 through n) communicatively coupled to a storage system 14. Storage system 14 may be shared among the plural nodes 12, such that each node 12 may read data from and write data to storage system 14. Cluster 10 may further include an operating system (OS), e.g., WINDOWS™, MAC OS™, or UNIX™.

In some embodiments, one or more devices (e.g., expanders, routers, and/or switches) may be coupled between nodes 12 and storage system 14. For example, as shown in FIG. 1, one or more expanders 16 may be coupled between nodes 12 and storage system 14. In other embodiments, nodes 12 may be coupled directly (e.g., without an expander) to storage system 14. Components of cluster 10 may communicate with each other via any suitable network(s) and wireless or wired communication links. Each component of cluster 10 may include one or more information handling systems.

Nodes 12 may include any information handling system suitable to perform the functions discussed herein, such as a server, for example. Each node 12 may be configured to send I/O commands (I/O's) 20 to storage system 14 in order to read data from, or write data to, storage system 14.

Expander(s) 16 may include any device(s) used to interconnect some or all nodes 12 with storage system 14 and/or to allow for increased numbers of nodes 12 to connect to storage system 14, e.g., one or more switches or routers.

Storage system 14 may include any memory, database(s), or other storage device(s) operable to store data. As discussed above, storage system 14 may be shared by the multiple nodes 12, such that each node 12 may send I/O's 20 to storage system 14. For example, as shown in FIG. 1, storage system 14 may include a target 22 and logical units 24. Each logical unit 24 may be represented by a logical unit number (LUN). In the illustrated example, logical units 0, 1, and 2 are shown. However, it should be understood that any storage system 14 may include any number of logical units 24. Target 22 may be a storage controller configured to control the multiple logical units 24.

In some embodiments or configurations, target 22 may be shared such that different nodes 12 are assigned to different LUNs 24. Alternatively, or in addition, individual LUNs 24 themselves may be shared by multiple nodes 12.

Target 22 and logical units 24 may have associated I/O queues for organizing I/O's 20 to be executed by storage system 14. FIG. 2 illustrates an example target I/O queue 30 associated with target 22, and example LUN I/O queues 32a, 32b, and 32c associated with logical units 0, 1, and 2, respectively.

Target I/O queue 30 may organize or order I/O's 20 (received from various nodes 12) to be executed by storage system 14. Target I/O queue 30 may organize or order I/O's 20 in any suitable manner, e.g., as a FIFO queue. In the illustrated embodiment, each I/O 20 in queue 30 is identified as x/y, where x represents the number of the node 12 that sent the I/O 20, and y indicates the LUN corresponding to the I/O 20. In the illustrated embodiment, queue is a FIFO queue in which I/O's 20 move downward as other I/O's 20 are executed.

Each LUN I/O queue 32 may organize or order I/O's 20 corresponding to that LUN 24, e.g., as a FIFO queue. Each I/O 20 in target I/O queue 30 is also entered into the appropriate LUN I/O queue 32. In the illustrated embodiment, each I/O 20 in each queue 32 is identified by the number of the node 12 that sent the I/O 20. Thus, in this example, queue 32 for LUN 1 includes I/O's 20 received from nodes 2, 3, and 1, in time order.

Each LUN I/O queue 32 may organize or order I/O's 20 in any suitable manner. For example, in the illustrated embodiment, each LUN I/O queue 32 is a FIFO queue in which I/O's 20 move downward as other I/O's 20 are executed.

Storage system 14 may also include, or be associated with, a reset management system 36 operable to manage storage system resets initiated by nodes 12, and a reset notification system 40 operable to notify nodes 12 of storage system resets. Reset management system 36 and reset notification system 40 are described in greater detail below.

In particular situations, nodes 12 may initiate storage system resets, each of which may comprise sending storage system 14 an instruction to reset at least a portion of storage system 14. For example, a node 12 may initiate (a) a hard reset, which comprises an instruction to reset target 22 or (b) a LUN reset, which comprises an instruction to reset a particular logical unit 24.

Nodes 12 may initiate storage system resets in various situations. For example, a node 12 may initiate a storage system reset if the node 12 has not received notification that an I/O 20 sent by that node 12 has been executed within a particular time. Initiation of such storage system reset may be regulated using a reset timer 50, which may be started upon sending the I/O 20 to storage system 14; if node 12 does not receive notification that the I/O 20 has been executed by the time reset timer 50 expires, node 12 may send a reset instruction 52 (e.g. a hard reset or a LUN reset) to storage system 14.

Reset instruction 52 received by storage system 14 may be managed by reset management system 36. In response, reset management system 36 may reset all or one or more portions (e.g., one or more LUNs 24) of storage system 14, which may include aborting (e.g., deleting or otherwise removing) I/O's 20 within I/O queues 30 and/or 32. For example, when storage system 14 resets target 22 in response to a hard reset, reset management system 36 may abort all queued I/O's 20 within target I/O queue 30 (and thus each LUN I/O queue 32 as well). When storage system 14 resets a particular logical unit 24 in response to a LUN reset, reset management system 36 may abort queued I/O's 20 within target I/O queue 30 that correspond to the logical unit 24 being reset and all queued I/O's 20 within the LUN I/O queue 32 corresponding to the logical unit 24 being reset.

Reset notification system 40 may be operable to notify nodes 12 of storage system resets. In some embodiments, reset notification system 40 may notify each node 12 (other than the node 12 that initiated the reset instruction 52) of a reset. After a reset, reset notification system 40 may notify particular nodes 12 of the reset in response to such nodes 12 submitting I/O's after the reset. In addition, reset notification system 40 may notify other nodes 12 that have not submitted any I/O's 20 for a particular time after the reset (e.g., where a certain node 12 is awaiting the response of a previously submitted I/O 20 before sending another I/O 20, or where a certain node 12 has a maximum allowed number of outstanding I/O's 20).

In some embodiments, reset notification system 40 may manage a reset notification timer 56. When a node 12 initiates, and reset management system 36 performs, a reset, reset notification system 40 may start reset notification timer 56. For each node 12, if storage system 14 receives an I/O 20 from that node 12 before reset notification timer 56 expires, reset notification system 40 may return the I/O 20 to the node 12 and notify the node 12 of the reset, e.g., by an additional message communicated along with the returned I/O 20. When timer 56 expires, reset notification system 40 may send a reset notification 60 to each node 12 (other than the node 12 that initiated the reset) that did not submit an I/O 20 during the duration of reset notification timer 56. In this manner, each node 12 may be notified of the reset, such that each node 12 may be informed that particular or all queued I/O's 20 sent from that node 12 have been aborted.

The duration of reset notification timer 56 may be predetermined. In some embodiments, the duration of reset notification timer 56 may be shorter than the duration of reset timer(s) 50 used by nodes 12 for determining whether to initiate a reset. Thus, a node 12 that has not submitted an I/O 20 within the duration of reset notification timer 56 may be notified of the reset (by a reset notification 60) before the node 12 initiates a reset. In this manner, unnecessary multiple resets may be reduced, which may increase the stability of cluster 10, reduce expenses, and/or prevent or reduce other system problems.

FIG. 3 illustrates a method of managing storage system resets and reset notifications 60, according to certain embodiments of the disclosure.

At 100, shared storage system 14 may receive I/O's from various nodes 12 of system 10. Such I/O's may comprise instructions to read data from and/or write data to, various storage locations maintained by storage system 14. Storage system 14 may queue each received I/O for execution, as indicated at 102. For example, storage system 14 may queue each I/O in a target I/O queue 30 and/or an appropriate LUN I/O queue 32.

At 104, storage system 14 may receive a reset instruction 52 (e.g. a hard reset or a LUN reset) from a particular node 12. In this example, suppose that Node 1 sends a reset instruction 52 to storage system 14 as a result of an I/O sent by Node 1 timing out (as determined based on reset timer 50).

At 106, in response to the reset instruction 52, reset management system 36 may reset all or one or more portions (e.g., one or more LUNs 24) of storage system 14. As discussed above, such reset may include aborting I/O's within I/O queues 30 and/or 32. The aborted I/O's may include zero, one, or more I/O's from each other node 12 in the cluster. Suppose in this example that an I/O previously received from Node 2 and queued by storage system 14 was aborted during the reset.

At 108, as part of, or in response to, resetting storage system 14, reset notification system 40 may set a reset notification indicator 64 (e.g., a flag or value) for each node 12 indicating that that node 12 has not yet been notified of the storage system reset.

In addition, at 110, reset notification system 40 may start a reset notification timer 56, which may have a predetermined duration. In some embodiments, reset notification timer 56 may have a duration that is shorter than the duration of reset timer(s) 50 used by nodes 12 for determining whether to initiate reset instructions 52.

During the duration of reset notification timer 56, storage system 14 may receive I/O's from zero, one or more of the nodes 12, as indicated at 112. In response to each I/O received from a unique node 12, reset notification system 40 may return the I/O to the node 12 and notify the node 12 of the reset, as indicated at 114. For example, regarding Node 2, if storage system 14 receives an I/O from Node 2 during the duration of reset notification timer 56, reset notification system 40 may return the I/O to Node 2 along with an additional message notifying Node 2 of the reset and/or that Node 2's previously queued I/O was aborted.

As indicated at 116, when reset notification timer notifies a node 12 of the storage system reset (in response to receiving an I/O from that node 12 during the duration of reset notification timer 56), reset notification system 40 may set or alter the reset notification indicator 64 corresponding to that node 12 to indicate that that node 12 has been notified of the reset. As an example only, reset notification system 40 may change the value of a flag from 0 to 1 for each node that sends an I/O to storage system 20 during the duration of timer 56.

At 118, reset notification timer 56 expires. In response, at 120, reset notification system 40 may determine which nodes 12 have not been notified of the storage system reset (e.g., nodes 12 that did not send any I/O's to storage system 14 during the duration of timer 56). For example, reset notification system 40 may check the current status of indicators 64 to determine which nodes 12 (if any) have not been notified of the reset.

At 122, reset notification system 40 may send a reset notification 60 to each node 12 that did not submit an I/O during the duration of reset notification timer 56. For example, reset notification system 40 sends Node 2 a reset notification 60 notifying Node 2 of the storage system reset and/or that Node 2's previously queued I/O was aborted. In some embodiments, reset notification system 40 does not send a reset notification 60 to the node that initiated the reset (in this example, Node 1), as such node is aware of the reset.

In this manner, each node 12 may be notified of the storage system reset, such that each node 12 may be informed that particular or all queued I/O's sent from that node 12 have been aborted.

Although the disclosed embodiments have been described in detail, it should be understood that various changes, substitutions and alterations can be made to the embodiments without departing from their spirit and scope.

What is claimed is:

1. A method of managing resets in a system using shared storage, comprising:
   receiving a reset instruction from a first node of a plurality of nodes that share a storage device;
   resetting at least a portion of the storage device in response to receiving the reset instruction;
   aborting a queued I/O command associated with the storage device in response to receiving the reset instruction, the queued I/O command received from a second node of the plurality of nodes;
   starting a reset notification timer having a defined duration in response to receiving the reset instruction;
   receiving an I/O command from the second node during the duration of the reset notification timer; and
   in response to receiving the I/O command from the second node, notifying, by the storage device, the second node of the storage device reset such that the second node can determine that the queued I/O command was aborted.

2. The method of claim 1, wherein the plurality of nodes and the storage device are arranged in a SAS cluster.

3. The method of claim 1, wherein the plurality of nodes are configured to communicate with the storage device via one or more expanders.

4. The method of claim 1, wherein:
   the storage device comprises a plurality of logical units, each logical unit having an associated I/O queue; and
   resetting at least a portion of the storage device comprises resetting at least one logical unit, including aborting any queued I/O commands in the I/O queue associated with the at least one logical unit.

5. The method of claim 1, wherein:
   the second node has an associated reset timer for sending a reset instruction to the storage device if the queued I/O command is not executed within a defined duration; and
   the defined duration of the reset notification timer is shorter than the defined duration of the reset timer.

6. A system comprising:
   a storage device; and
   a reset management system configured to:
      receive a reset instruction from a first node of a plurality of nodes that share the storage device;
      reset at least a portion of the storage device in response to the reset instruction;
      abort a queued I/O command associated with the storage device in response to the reset instruction, the queued I/O command received from a second node of the plurality of nodes;
      start a reset notification timer having a defined duration in response to the reset instruction;
      receive an I/O command from the second node during the duration of the reset notification timer; and
      in response to receiving the I/O command from the second node, notify, by the storage device, the second node of the storage device reset such that the second node can determine that the queued I/O command was aborted.

7. The system of claim 6, wherein the plurality of nodes and the storage device are arranged in a SAS cluster.

8. The system of claim 6, wherein the plurality of nodes are configured to communicate with the storage device via one or more expanders.

9. The system of claim 6, wherein:
   the storage device comprises a plurality of logical units, each logical unit having an associated I/O queue; and
   resetting at least a portion of the storage device comprises resetting at least one logical unit, including aborting any queued I/O commands in the I/O queue associated with the at least one logical unit.

10. The system of claim 6, wherein:
    the second node has an associated reset timer for sending a reset instruction to the storage device if the queued I/O command is not executed within a defined duration; and
    the defined duration of the reset notification timer is shorter than the defined duration of the reset timer.

11. The system of claim 6, wherein:
    the second node has an associated reset timer for sending a reset instruction to the storage device if the queued I/O command is not executed within a defined duration; and
    the defined duration of the reset notification timer is shorter than the defined duration of the reset timer.

12. A method of managing resets in a system using shared storage, comprising:
    receiving a reset instruction from a first node of a plurality of nodes that share a storage device;
    resetting at least a portion of the storage device in response to receiving the reset instruction;
    aborting a queued I/O command associated with the storage device in response to receiving the reset instruction, the queued I/O command received from a second node of the plurality of nodes;
    starting a reset notification timer having a defined duration in response to receiving the reset instruction; and if no I/O command is received from the second node during the duration of the reset notification timer, in response to the expiration of the timer, notifying, by the storage device, the second node of the storage device reset such that the second node can determine that the first queued I/O command was aborted.

13. The method of claim 12, wherein the plurality of nodes and the storage device are arranged in a SAS cluster.

14. The method of claim 12, wherein the plurality of nodes are configured to communicate with the storage device via one or more expanders.

15. The method of claim 12, wherein:
the storage device comprises a plurality of logical units, each logical unit having an associated I/O queue; and
resetting at least a portion of the storage device comprises resetting at least one logical unit, including aborting any queued I/O commands in the I/O queue associated with the at least one logical unit.

16. The method of claim 12, wherein:
the second node has an associated reset timer for sending a reset instruction to the storage device if the queued I/O command is not executed within a defined duration; and
the defined duration of the reset notification timer is shorter than the defined duration of the reset timer.

17. A system comprising:
a storage device; and
a reset management system configured to:
receive a reset instruction from a first node of a plurality of nodes that share the storage device;
reset at least a portion of the storage device in response to the reset instruction;
abort a queued I/O command associated with the storage device in response to the reset instruction, the queued I/O command received from a second node of the plurality of nodes;
start a reset notification timer having a defined duration in response to the reset instruction; and
if no I/O command is received from the second node during the duration of the reset notification timer, in response to the expiration of the timer, notify, by the storage device, the second node of the storage device reset such that the second node can determine that the first queued I/O command was aborted.

18. The system of claim 17, wherein the plurality of nodes and the storage device are arranged in a SAS cluster.

19. The system of claim 17, wherein the plurality of nodes are configured to communicate with the storage device via one or more expanders.

20. The system of claim 17, wherein:
the storage device comprises a plurality of logical units, each logical unit having an associated I/O queue; and
resetting at least a portion of the storage device comprises resetting at least one logical unit, including aborting any queued I/O commands in the I/O queue associated with the at least one logical unit.

* * * * *